Patented June 29, 1943

2,322,989

UNITED STATES PATENT OFFICE 2,322,989

PROCESS OF MAKING CARBON BLACK AND MIXTURES OF CARBON MONOXIDE AND HYDROGEN FROM HYDROCARBON GASES

William D. Wilcox, Pekin, Ill.; Mary Palmer Wilcox, executrix of said William D. Wilcox, deceased, assignor, by mesne assignments, to Oil and Gas Research, Inc., Wilmington, Del., a corporation of Delaware No Drawing. Application August 11, 1939, Serial No. 289,588

4 Claims. (Cl. 23—209.4)

It has long been known that when hydrocarbon gases are heated to a quite high temperature, they are more or less dissociated to carbon and hydrogen. Heating has been employed to obtain carbon in the form of a soot to which the name of carbon black is given. In the procedure followed, the gas is passed through a chamber filled with checker brick and brought to a temperature of around 2400° F. by precedent combustion of fuel gas within the chamber. Dissociation of the hydrocarbon gas has not, in actual operation, been carried to completion. Around 90% only of the gas is dissociated. If we assume the gas to be a pure methane, what takes place may be indicated by the equation 1000 c. f. $CH_4$+heat=28.8 lbs. C.+1800 c. f. H+100 c. f. $CH_4$. Not all of the carbon evolved is recovered. It is very adherent and, as stated by one of the patentees of the procedure, "approximately two-thirds of the total solid carbon black formed remains on the checker brick and is not recovered."

In the form of plant disclosed in my U. S. 1,916,545, in which the checker brick is replaced by a multiplicity of refractory walled flues, all the exposed surfaces of which are parallel with the direction of gas flow and constantly swept by the current of gas and in which by using the discharged combustion gas to preheat the air which supports combustion in the reheating cycle, we are able to create a higher temperature, secure the same degree of dissociation with the hydrocarbon gas passed through the chamber at a higher velocity, and to recover up to 18 lbs. of carbon black from a total of around 28 lbs. evolved.

My procedure may be carried out in plant differing in detail from what is shown in U. S. 1,916,545, but I will preferably employ it in carrying out my process. But little use of the residual gas has been made in the past. The greater portion has been wasted to the air. It is the purpose of my procedure to obtain a residue gas, following the recovery of the carbon black, which will be approximately one-third carbon monoxide and two-thirds hydrogen, and usable in the synthesis of methanol or of the liquid hydrocarbons to which the name of synthin has been given.

In order that this residual gas be suitable for such use with good efficiency, the dissociation of the hydrocarbon gas must be carried much more nearly to completion. To effect a dissociation to within the range 96-99% will, at any given temperature, require a much longer time of subjection to heat than is required to bring about a 90% dissociation. This will tend to lower the quality of the carbon black and, through the lowered velocity of throughput, cause an increase in the proportion of the carbon black which remains in the chamber and is not recovered. To reduce these losses, I employ temperatures within the range 2800–3000° F. in the zone of active combustion which is readily created using preheated air in the reheating cycle; and I substantially extend the distance of travel of the gas within the chamber so that the desired degree of dissociation will be obtained at a velocity which creates turbulence and accelerates the rate of heat transfer from the flue walls. The combustion gases may be discharged to the heat exchanger at a temperature within the range 1200–1400° F., but as the hydrocarbon gas is passed through in a reverse direction, it is brought progressively in contact with more highly heated refractories.

The lining of the chamber and the flue walls within the zone of maximum temperature will preferably be of silicon carbide brick in order to escape injury by heat.

In one modification of my procedure, I secure the desired volumetric ratio of CO to hydrogen, by introducing in to the hydrocarbon gas, prior to its pyrolysis, a controlled volume of carbon dioxide just one-half of that of the methane. What takes place will be indicated by the equation 1000 c. f. $CH_4$ plus 500 c. f. $CO_2$ plus heat equals 16 lbs. C plus 1000 c. f. CO plus 2000 c. f. $H_2$. This, only if the dissociation is carried to completion. Only one-half of the total carbon remains as carbon black. It appears probable that, due to a somewhat lower velocity, the proportion of carbon black which remains entrained in the gas will be less. There will be, however, a quite substantial improvement in the quality of the carbon, due to the increased dilution by the CO found in the reaction C plus $CO_2$ equals 2CO, and to the entrained carbon being less.

The same betterment is secured as is obtained by a prior dilution with inert gases. The total recovery of carbon black can be increased by reducing the volume of $CO_2$ added in a first stage pyrolysis, as indicated by the equation 1000 c. f. $CH_4$ plus 200 c. f. $CO_2$ equals 25.4 lbs. C plus 400 $CO_2$ plus 2000 c. f. $H_2$. In a second stage of the make cycle prior to reheating, 300 c. f. of $CO_2$, will be passed through the chamber uniting with the carbon adherent to the flue walls, according to the equation C plus $CO_2$ plus heat equals 2CO. This, being mixed with the gas given off in the first stage, will yield a product in which the carbon monoxide and hydrogen are in the 1:2 ratio desired—if it be found that, due to the longer time of heating, the loss of carbon by adherence is so increased that over half of the total carbon remains in the chamber, no $CO_2$ will be added in the first stage of the make cycle. Betterment in quality can then be secured by a greater or less dilution with residual gas. All of the $CO_2$ will be introduced in a second stage and the loss of carbon black by its final retention and burning off in the reheating cycle, will be reduced to a minimum. The reaction will be $CH_4$ plus heat equals C plus $2H_2$; C plus $CO_2$ equals $2CO$.

The necessity of securing a substantially complete dissociation of the hydrocarbon gas where the product gas is to be used in the synthesis of methanol arises from the loss of efficiency in the synthesis when there is present in the gas synthesized, a material percent of undecomposed methane which, even where initially small, progressively increases in proportion as the gas subjected to synthesis is recirculated following a withdrawal of the methanol formed. Lack of completeness in the conversion of $CO_2$ to $CO$ is less detrimental as $CO_2$ unites with hydrogen to form methanol, according to the equation $CO_2$ plus $3H_2$ equals $CH_3OH$ plus $H_2O$.

I conceive it to be possible to obtain the required volume of $CO_2$ by the calcining of limestone in a closed retort with the cost entirely or for the most part, returned from the sale of the lime formed in the reaction $CaCO_3$ plus heat equals $CaO$ plus $CO_2$.

Where the economic conditions do not render this possible, steam may be used in place of $CO_2$ as the oxidizing agent. The gas substantially a pure hydrogen obtained in the first stage of the make cycle will be conserved in a gas holder. Steam is then introduced in a volume adequate to take up practically all of the carbon retained on the flue walls. The reaction C plus $H_2O$ equals $CO$ plus $H_2$ will result. In actual operation, there will be some excess of hydrogen due to the reaction C plus $2H_2O$ equals $CO_2$ plus $2H_2$. The gas generated in the second stage of the make cycle will be withdrawn through a separate outlet and the proportion of hydrogen increased by adding a part of the hydrogen obtained in the first stage. While the proportions at which CO and hydrogen unite to form methanol are 1:2, in actual operation some excess of hydrogen (from 5 to 10%) will be found advantageous as an excess of hydrogen in the conversion chamber tends to check some undesirable side reactions. I do not limit myself in the operation of my process to a precise 1:2 ratio in the product gas. The gas issuing, during the first stage of the make cycle is, following cooling, passed through an electric precipitator or bag filters to recover the entrained carbon. The gas from the second stage, where steam is employed, may be passed through a waste heat boiler to generate the steam. As the outlet temperature at the close of the cycle will be around 1800° F., it will provide all the steam required.

I need hardly call attention to the desirability of employing a hydrocarbon gas which is substantially free from nitrogen. No readily usable means exist for its removal and, if present in the product gas, it will equally with undecomposed methane by its accumulation in the circuit, reduce the rate of methanol formation and compel a bleeding off of a part of the recirculated gas to check a further accumulation. Care must also be taken to completely displace the combustion gases at the end of the reheating cycle either by shutting off the air for an interval prior to shutting off the fuel gas, or by purging with steam.

A thermostat on the gas outlet will assist in informing the operator when, through the absorption of heat, the temperature of the flue walls has so fallen that a satisfactory degree of dissociation or combination does not take place.

What I claim as new and desire to protect by the issuance to me of Letters Patent is:

1. The process of producing carbon black, carbon monoxide and carbon monoxide hydrogen gas mixtures having a ratio of the hydrogen to the carbon monoxide of two to one, which consists in the steps of pyrolysis within a dissociation chamber, at a temperature range of 2800°–3000° F. of hydrocarbon gas to which has been added a volume of carbon dioxide less than half the volume of the hydrocarbon gas; the separation of the resultant gas mixture and the carbon particles not retained within the chamber; and then introducing into the chamber, a volume of carbon dioxide which together with the carbon dioxide added in the first step of the process is equal to approximately one-half the volume of the said hydrocarbon gas, reacting the carbon dioxide at a high temperature with the residual carbon to form carbon monoxide, said carbon monoxide being added to the said resultant gas mixture obtained in the first step.

2. The process of producing carbon black and carbon monoxide hydrogen gas mixtures having a ratio of the hydrogen to the carbon monoxide of two to one, which consists in the steps of pyrolysis within a dissociation chamber at a temperature range of 2800°–3000° F. of hydrocarbon gas to which has been added a volume of carbon dioxide less than half the volume of the hydrocarbon gas; the separation of the resultant gas mixture and the carbon particles not retained within the chamber; and then introducing into the chamber before it has appreciably cooled a volume of carbon dioxide which together with the carbon dioxide added in the first step of the process is approximately equal to one-half the volume of said hydrocarbon gas, reacting the carbon dioxide at a higher temperature with the residual carbon to form carbon monoxide, said carbon monoxide being added to the said resultant gas mixture obtained in the first step.

3. The process of producing carbon black and carbon monoxide hydrogen gas mixtures having a ratio of the hydrogen to the carbon monoxide of two to one, which consists in the steps of pyrolysis within a dissociation chamber, at a temperature range of 2800°–3000° F. of a given volume of hydrocarbon gas; the separation of the resultant gas mixture and the carbon particles not retained within the chamber; and then introducing carbon dioxide into the chamber in a volume which is equal to approximately one-half the volume of the said hydrocarbon gas, reacting the carbon dioxide at a high temperature with the residual carbon to form carbon monoxide, said carbon monoxide being added to the said resultant gas mixture obtained in the first step.

4. The process of producing carbon black and carbon monoxide hydrogen gas mixtures having a ratio of the hydrogen to the carbon monoxide of two to one, which consists in the steps of pyrolysis within a dissociation chamber, at a temperature range of 2800°–3000° F. of a given volume of hydrocarbon gas; the separation of the resultant gas mixture and the carbon particles not retained within the chamber; and then introducing into the chamber before it has appreciably cooled a volume of carbon dioxide which is equal to approximately one-half the volume of the said hydrocarbon gas reacting the carbon dioxide at a high temperature with the residual carbon to form carbon monoxide, the said carbon monoxide being added to the said resultant gas mixture obtained in the first step.

WILLIAM D. WILCOX.